United States Patent
Kim et al.

(10) Patent No.: US 11,695,161 B2
(45) Date of Patent: Jul. 4, 2023

(54) BATTERY CELL HAVING STRUCTURE FOR PREVENTION OF SWELLING

(71) Applicant: LG Chem, Ltd., Seoul (KR)

(72) Inventors: Min-Kyung Kim, Gyeongsangbuk-do (KR); Joo-Hwan Sung, Daejeon (KR)

(73) Assignee: LG Energy Solution, Ltd.

( * ) Notice: Subject to any disclaimer, the term of this patent is extended or adjusted under 35 U.S.C. 154(b) by 610 days.

(21) Appl. No.: 16/323,693

(22) PCT Filed: Oct. 31, 2017

(86) PCT No.: PCT/KR2017/012188
§ 371 (c)(1),
(2) Date: Feb. 6, 2019

(87) PCT Pub. No.: WO2018/080285
PCT Pub. Date: May 3, 2018

(65) Prior Publication Data
US 2019/0207265 A1 Jul. 4, 2019

(30) Foreign Application Priority Data
Oct. 31, 2016 (KR) .................. 10-2016-0142995

(51) Int. Cl.
*H01M 10/0587* (2010.01)
*H01M 10/04* (2006.01)
(Continued)

(52) U.S. Cl.
CPC ... *H01M 10/0587* (2013.01); *H01M 10/0422* (2013.01); *H01M 10/0431* (2013.01);
(Continued)

(58) Field of Classification Search
CPC ............ H01M 50/102; H01M 50/136; H01M 50/168; H01M 50/14; H01M 50/471; H01M 50/581; H01M 50/59
See application file for complete search history.

(56) References Cited

U.S. PATENT DOCUMENTS

| | | | |
|---|---|---|---|
| 5,916,707 A | 6/1999 | Omaru et al. | |
| 8,202,648 B2 | 6/2012 | Uh et al. | |

(Continued)

FOREIGN PATENT DOCUMENTS

| | | | |
|---|---|---|---|
| JP | H09199087 A | 7/1997 | |
| JP | H09199089 A | 7/1997 | |

(Continued)

OTHER PUBLICATIONS

KR20050015006A translation (Year: 2005).*
(Continued)

*Primary Examiner* — Ula C Ruddock
*Assistant Examiner* — Amanda Rosenbaum
(74) *Attorney, Agent, or Firm* — Lerner David LLP

(57) ABSTRACT

A battery cell is configured such that a jelly-roll type electrode assembly is accommodated in a battery casing, and includes: the battery casing including upper, lower, and side surfaces, wherein the side surface of the battery casing includes an isolation wall providing a buffer space between the battery casing and the electrode assembly. The buffer space accommodates deformation of the electrode assembly when the electrode assembly is expanded, such that deformation of the side surface of the battery casing is prevented from occurring.

19 Claims, 3 Drawing Sheets

(51) Int. Cl.
*H01M 50/103* (2021.01)
*H01M 50/107* (2021.01)
*H01M 50/119* (2021.01)
*H01M 50/133* (2021.01)
*H01M 50/131* (2021.01)

(52) U.S. Cl.
CPC ....... *H01M 50/103* (2021.01); *H01M 50/107* (2021.01); *H01M 50/119* (2021.01); *H01M 50/133* (2021.01); *H01M 50/131* (2021.01)

(56) References Cited

U.S. PATENT DOCUMENTS

| | | | |
|---|---|---|---|
| 9,343,772 B2 | 5/2016 | Byun | |
| 2008/0220328 A1 | 9/2008 | Uh et al. | |
| 2010/0304201 A1* | 12/2010 | Caumont | H01M 10/42 429/120 |
| 2012/0088146 A1* | 4/2012 | Byun | H01M 10/0468 429/163 |
| 2012/0107678 A1* | 5/2012 | Kim | H01M 10/02 429/186 |
| 2013/0273401 A1* | 10/2013 | Lee | H01M 50/184 429/185 |
| 2016/0104873 A1* | 4/2016 | Smythe | H01M 10/425 429/56 |
| 2016/0172637 A1* | 6/2016 | Hamada | H01M 50/116 429/163 |
| 2016/0301050 A1* | 10/2016 | Peng | H01M 50/502 |

FOREIGN PATENT DOCUMENTS

| | | | |
|---|---|---|---|
| JP | 2000090903 A | | 3/2000 |
| JP | 2011150961 A | * | 8/2011 |
| JP | 2015118828 A | * | 6/2015 |
| KR | 20050015006 A | * | 2/2005 |
| KR | 20050015006 A | | 2/2005 |
| KR | 20060111832 A | | 10/2006 |
| KR | 20090129621 A | | 12/2009 |
| KR | 20110075789 A | | 7/2011 |
| KR | 101309151 B1 | | 9/2013 |

OTHER PUBLICATIONS

JP-2015118828-A translation (Year: 2015).*
JP 2011150961A translation (Year: 2011).*
Search Report from International Application No. PCT/KR2017/012188, dated Feb. 5, 2018.

* cited by examiner

[FIG. 1]
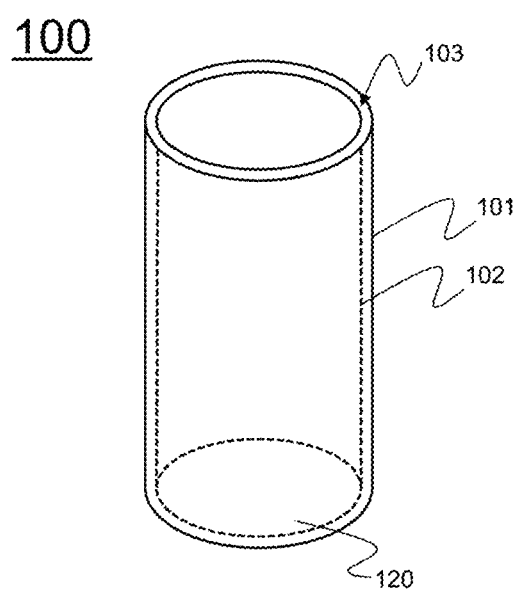

[FIG. 2]
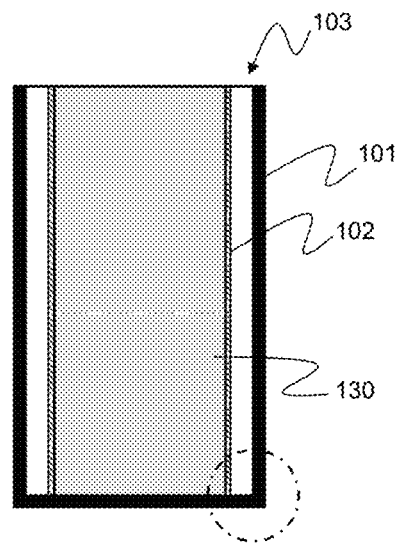
[FIG. 3]
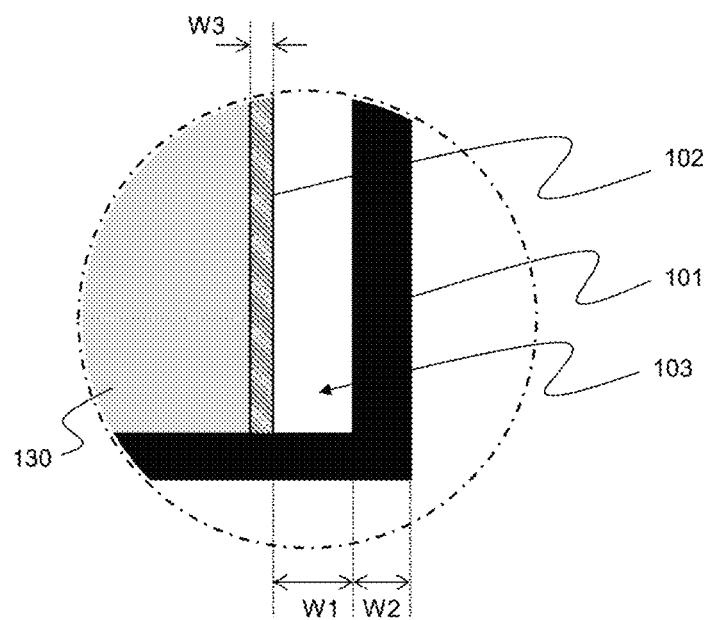

[FIG. 4]
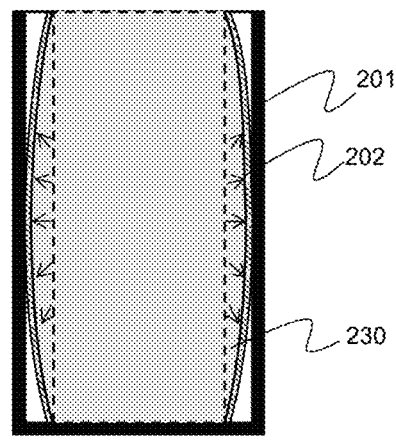

BATTERY CELL HAVING STRUCTURE FOR PREVENTION OF SWELLING

CROSS-REFERENCE TO RELATED APPLICATIONS

This application is a national phase entry under 35 U.S.C. § 371 of International Application No. PCT/KR2017/012188, filed on Oct. 31, 2017, published in Korean, which claims priority to Korean Patent Application No. 10-2016-0142995, filed on Oct. 31, 2016, the disclosures of which are hereby incorporated herein by reference.

BACKGROUND OF THE INVENTION

Field of the Invention

The present invention relates to a battery cell having a structure for prevention of swelling.

Description of the Related Art

Due to the development of techniques associated with mobile devices and increase in demand therefor, demand for secondary batteries has also rapidly increased. Among such secondary batteries, lithium secondary batteries, which have high energy density, high operating voltage, and excellent charge retention and lifespan characteristics, are widely used as an energy source of various electric products including mobile devices.

Depending on the shape of a battery casing, the secondary batteries may be classified into cylindrical and prismatic batteries in which an electrode assembly is mounted in cylindrical and prismatic metal cans, respectively, and a pouch-shaped battery in which an electrode assembly is mounted in a pouch-shaped casing made of an aluminum laminate sheet. Of these, the cylindrical battery has advantages of relatively high capacity and excellent structural stability.

Further, the secondary batteries may be classified in terms of an positive electrode/separator/negative electrode structure of the electrode assembly, and generally include, as representative examples, a jelly-roll type (winding-type) electrode assembly configured to have a structure in which a positive electrode and a negative electrode each having a long sheet shape are wound with a separator interposed therebetween, a stack-type (laminate-type) electrode assembly configured to have a structure in which pluralities of positive electrodes and negative electrodes each having a predetermined size are sequentially stacked with separators interposed therebetween, resepectively; and a stack/folding-type electrode assembly configured to have a structure in which pluralities of positive electrodes and negative electrodes having a predetermined size are stacked with a separator interposed therebetween to constitute a bi-cell or a full cell and then a plurality of bi-cells or full cells is wound.

Of these, the jelly-roll-type electrode assembly has advantages of easy manufacture and high energy density per weight. However, the jelly-roll type electrode assembly is obtained by winding long sheet-shaped positive and negative electrodes in a dense arrangement to have a cylindrical or elliptical structure in cross section. Thus, stress caused due to expansion and contraction of the electrodes during charging and discharging is accumulated in the electrode assembly, and when such stress accumulation exceeds a certain limit, deformation of the electrode assembly may occur. As a result, the spacing between the electrodes may not be properly maintained, resulting in a rapid degradation in performance of the battery, and an internal short-circuit causing a degradation in safety of the battery.

As described above, due to deformation of the jelly-roll type electrode assembly, the shape of the battery casing accommodating the jelly-roll type electrode assembly is convexly swollen, leading to an increase in a defective rate in a manufacturing process. Particularly in the case of a cylindrical battery cell, considering the fact that the size of the outer diameter of the battery casing tends to be designed without considering the expansion of the electrode assembly, there is a high demand for a technique for solving such a problem of deformation of the battery casing.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art.

The present inventors of the present application have conducted intensive research and various experiments, and as described later, found that when using a battery cell including an isolation wall configured to provide a buffer space between a jelly-roll type electrode assembly and a battery casing, the buffer space accommodates deformation of the electrode assembly due to expansion thereof so that deformation of the battery casing is prevented from occurring, thus leading to the present invention.

In order to achieve the above object, according to one aspect of the present invention, there is provided a battery cell, including: a jelly-roll type electrode assembly, a the battery casing including upper, lower, and side surfaces, the jelly-roll type electrode assembly being accommodated in the battery casing, and an isolation wall providing a buffer space between the a sidewall of the battery casing and the electrode assembly, the buffer space configured to accommodate deformation of the electrode assembly when the electrode assembly is expanded, such that deformation of the side surface of the battery casing is prevented from occurring.

As described above, the battery cell according to the present invention includes the isolation wall provided inside of the side surface of the battery casing and providing the buffer space between the electrode assembly and the battery casing, whereby the isolation wall can accommodate deformation of the electrode assembly due to expansion thereof.

The jelly-roll type electrode assembly is repeatedly expanded and contracted in volume due to repeated intercalation and deintercalation of lithium ions during charge and discharge of the battery cell. In other words, when the battery cell is charged and discharged, the entire volume thereof is repeatedly expanded and contracted within a predetermined numerical range. Accordingly, when the electrode assembly is expanded, stress is concentrated in the battery casing, and this phenomenon acts as a cause of cell deterioration.

In addition, such expansion and contraction of the electrode assembly is inevitable, and expansion beyond a predetermined range causes an increase in the defective rate of the battery cell. In this regard, the battery cell according to the present invention includes the isolation wall that provides the buffer space between the electrode assembly and the battery casing. Thus, even when the electrode assembly is expanded and thus deformed, the shape of the battery casing may not be affected whereby the defective rate of the battery cell can be lowered.

The battery casing may not be limited in structure as long as it can accommodate a jelly-roll type electrode assembly and can be provided with the isolation wall inside of the side surface of the battery casing, and may have a prismatic battery casing shape or a cylindrical battery casing shape.

The battery cell according to the present invention may be configured such that the thickness of the buffer space is greater than the amount of increase in thickness of the expanded electrode assembly in consideration of the fact that deformation of the battery casing does not occur even when the electrode assembly is expanded. The buffer space may be configured such that a gap defined between the isolation wall and the sidewall is in a range of 80% to 110%, specifically 90% to 110%, and is more specifically 100%, based on an amount of change in thickness of the electrode assembly before and after expansion of the electrode assembly. In other words, considering that deformation of the battery casing does not occur when a portion of the electrode assembly, which is increased in volume at the time of maximum expansion thereof, is accommodated in the buffer space, and the dead space is increased when the gap of the buffer space is set to be unnecessarily large, the gap defined from the isolation wall with respect to the side surface may correspond to the amount of change in thickness before and after expansion of the electrode assembly.

Meanwhile, considering that the dead space can be prevented from being formed in the battery cell, the isolation wall may be positioned in close contact with the outer surface of the electrode assembly so as to be deformed into a shape corresponding to a shape of the electrode assembly when the electrode assembly is expanded.

In one specific example, the sidewall of the battery casing and the isolation wall may be made of the same material. For example, the sidewall of the battery casing and the isolation wall may be made of aluminum, aluminum alloy, or stainless steel, and may be made of a metal material having a high rigidity such that even when the electrode assembly is expanded, deformation of the battery casing is prevented from occurring.

Herein, deformation of the isolation wall occurs in response to deformation of the electrode assembly due to volume expansion thereof, whereas deformation of the side surface of the battery casing does not occur despite volume expansion of the electrode assembly. Thus, the thickness of the side surface of the battery casing may be greater than the thickness of the isolation wall. For example, the thickness of the sidewall of the battery casing may be in a range of 100% to 300% and more specifically 150% to 250%, of a thickness of the isolation wall.

In another specific example, the sidewall of the battery casing and the isolation wall may be made of different materials. For example, the sidewall of the battery casing may be made of aluminum, aluminum alloy, or stainless steel, which has a high rigidity, such that deformation of the side surface of the battery casing does not occur despite volume expansion of the electrode assembly. The isolation wall may be made of an elastic material such that deformation of the isolation wall occurs in response to deformation of the electrode assembly that repeats expansion and contraction.

In addition, since the electrode assembly is repeatedly expanded and contracted during charge and discharge, when the expanded electrode assembly is contracted to an original state thereof, the isolation wall can be restored to a previous shape thereof in response to a shape of the contracted electrode assembly without maintaining in an expanded state.

In the battery cell according to the present invention, considering that deformation of the electrode assembly occurs on the entire outer peripheral surface of the electrode assembly whereas stress is concentrated on a central portion thereof, the electrode assembly may be deformed such that a change in an outer diameter of the central portion thereof is largest with respect to the height direction of the electrode assembly.

As such, considering that the change in the outer diameter of the central portion of the electrode assembly is largest, the isolation wall providing the buffer space may be configured such that a height thereof is greater than a midpoint of the height of the battery casing. Accordingly, the height of the isolation wall may be in a range of 60% to 100% of a height of the battery casing.

In one specific example, as described above, the battery casing includes the upper, lower, and side surfaces, and the side surface includes the isolation wall. On the other hand, the lower surface of the battery casing is relatively small in volume expansion of the electrode assembly, and thus may have a single-walled structure.

According to another aspect of the present invention, there is provided a device including a battery pack as a power source, the battery pack including the battery cell as a unit cell.

The device may be, for example, a notebook computer, a netbook, a tablet PC, a mobile phone, an MP3, a wearable electronic device, a power tool, an electric vehicle (EV), a hybrid electric vehicle (HEV), a plug-in hybrid electric vehicle (PHEV), an electric bicycle (E-bike), an electric scooter (E-scooter), an electric golf cart, a power storage system, etc, but is not limited thereto.

Since the structure and manufacturing method of such a device are well known in the related art, a detailed description thereof will be omitted herein.

As described above, the battery cell according to the present invention includes the isolation wall for providing the buffer space between the electrode assembly and the battery casing such that the buffer space accommodates deformation of the electrode assembly due to expansion thereof. Thus, even when the electrode assembly is expanded in volume at the time of full charge of a battery, the buffer space can accommodate the expansion of the electrode assembly, so that deformation of the battery casing can be prevented from occurring.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a perspective view showing a battery casing according to an embodiment of the present invention;

FIG. 2 is a vertical cross-sectional view showing a battery cell according to the embodiment of the present invention;

FIG. 3 is a partial enlarged view of FIG. 2; and

FIG. 4 is a vertical cross-sectional view showing a battery cell in a state in which an electrode assembly is expanded.

DETAILED DESCRIPTION OF THE INVENTION

Hereinbelow, exemplary embodiments of the present invention will be described in detail with reference to the accompanying drawings. Various changes to the following embodiments are possible and the scope of the present invention is not limited to the following embodiments FIG. 1 is a perspective view schematically showing a battery casing constituting a battery cell according to the present invention.

Referring to FIG. 1, the battery casing 100 is a cylindrical battery casing including an upper surface (not shown), a lower surface 120, and a side surface 101. An isolation wall 102 is provided in the battery casing 100 by vertically extending parallel to the side surface of the battery casing 100, whereby a buffer space 103 is defined between the isolation wall 102 and the side surface 101, the buffer space accommodating deformation of an electrode assembly when the electrode assembly is expanded. Thus, the battery casing 100 is constructed such that the side surface 101 has a double structure in which the buffer space 103 is defined between the side surface 101 and the isolation wall 102, while the lower surface 120 has a single structure. Although FIG. 1 shows a cylindrical battery casing, the scope of the present invention includes a battery cell including a prismatic battery casing for accommodating a jelly-roll type electrode assembly without being limited to the battery cell including the cylindrical battery casing.

FIG. 2 is a vertical cross-sectional view schematically showing a state in which the electrode assembly is accommodated in the battery casing of FIG. 1, and FIG. 3 is a schematic partial enlarged view of FIG. 2.

Referring to FIGS. 2 and 3, an electrode assembly 130 is accommodated in the battery casing 100, and the isolation wall 102 is positioned in close contact with an outer surface of the electrode assembly 130. The side surface 101 and the isolation wall 102 of the battery casing 100 may be made of the same material or may be made of different materials. When the side surface 101 and the isolation wall 102 are made of the same material, a thickness W2 of the side surface 101 may be determined in a range of 100 to 300% of a thickness W3 of the isolation wall 102 considering the functional characteristics of each of the side surface 101 and the isolation wall 102.

Further, the buffer space 103 may be configured such that a gap W1 defined from the isolation wall 102 with respect to the side surface 101 is in a range of 80 to 110% based on the amount of change in thickness before and after expansion of the electrode assembly 130. Moreover, a height of the isolation wall 102 may be determined in a range of 60 to 100% with respect to a height of the battery casing 100.

FIG. 4 is a vertical cross-sectional view schematically showing a battery cell in a state an electrode assembly is expanded.

Referring to FIG. 4, an electrode assembly 230 is expanded such that a change in an outer diameter of a central portion thereof is largest with respect to the height direction of the electrode assembly 230. An isolation wall 202 is deformed into a shape corresponding to a shape of the expanded electrode assembly 230, whereas a side surface 201 of the battery casing is not deformed in outer diameter even when the electrode assembly 230 is expanded. When the electrode assembly 230 is expanded, deformation of the isolation wall 202 positioned in close contact with the electrode assembly 230 occurs corresponding to the shape of the expanded electrode assembly 230, whereby the isolation wall 202 is expanded and thus brought into contact with the side surface 201 of the battery casing. When the expanded electrode assembly 230 is contracted, the deformed isolation wall 202 can be restored to a previous shape thereof.

As described above, the battery cell according to the present invention includes the isolation wall provided in the battery casing and positioned in close contact with the electrode assembly, and the buffer space defined between the isolation wall and the side surface of the battery casing. Thus, even when expansion of a jelly-roll type electrode assembly occurs, the outer diameter of the battery casing can be prevented from being deformed.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A battery cell, comprising:
a jelly-roll type electrode assembly;
a battery casing extending along a longitudinal axis between upper and lower surfaces, and having a sidewall extending therebetween, the jelly-roll type electrode assembly being accommodated in the battery casing; and
an isolation wall offset inwardly towards the longitudinal axis from the sidewall such that the isolation wall is not in contact with the sidewall in an undeformed state, the isolation wall being in direct physical contact with the battery casing in the undeformed state, and the isolation wall extending alongside the sidewall along the longitudinal axis so as to define a buffer space between the sidewall and the isolation wall, the buffer space configured to accommodate deformation of the electrode assembly when the electrode assembly is expanded by allowing the electrode assembly to deform the isolation wall outwardly into the buffer space towards the sidewall, such that deformation of the sidewall of the battery casing is prevented from occurring, wherein the buffer space extends around a complete perimeter of the battery casing that extends about the longitudinal axis.

2. The battery cell of claim 1, wherein the battery casing has a prismatic or cylindrical shape.

3. The battery cell of claim 1, wherein the buffer space is configured such that a gap defined between the isolation wall and the sidewall is in a range of 80% to 110% of a thickness of the sidewall based on an amount of change in thickness of the electrode assembly before and after expansion of the electrode assembly.

4. The battery cell of claim 1, wherein the isolation wall is positioned in close contact with an outer surface of the electrode assembly such that deformation of the isolation wall occurs corresponding to a shape of the electrode assembly when the electrode assembly is expanded.

5. The battery cell of claim 1, wherein the battery casing is configured such that the sidewall and the isolation wall are made of a same material.

6. The battery cell of claim 5, wherein the battery casing is configured such that the sidewall and the isolation wall are made of aluminum, aluminum alloy, or stainless steel.

7. The battery cell of claim 6, wherein the battery casing is configured such that thickness of the sidewall is in a range of 100% to 300% of a thickness of the isolation wall.

8. The battery cell of claim 1, wherein the battery casing is configured such that the sidewall and the isolation wall are made of different materials.

9. The battery cell of claim 8, wherein the battery casing is configured such that the sidewall is made of aluminum, aluminum alloy, or stainless steel, and the isolation wall is made of an elastic material.

10. The battery cell of claim 1, wherein when the electrode assembly is expanded and then contracted to an original shape thereof, the isolation wall is expanded and then restored to a previous shape thereof.

11. The battery cell of claim 1, wherein the electrode assembly is configured to expand such that a change in an outer diameter of a central portion thereof is largest with respect to a height direction of the electrode assembly.

12. The battery cell of claim 1, wherein the isolation wall is configured such that a height thereof is in a range of 60% to 100% of a height of the battery casing.

13. The battery cell of claim 1, wherein the lower surface of the battery casing has a single-walled structure.

14. A device, comprising:
the battery cell of claim 1.

15. The battery cell of claim 1, wherein the buffer space extends a full height of the battery casing along the longitudinal axis.

16. The battery cell of claim 1, wherein the battery casing has a cylindrical shape extending along the longitudinal axis, and wherein the buffer space defines an annular region extending around the longitudinal axis.

17. The battery cell of claim 2, wherein the isolation wall is coaxially arranged with respect to the sidewall.

18. The battery cell of claim 1, wherein the isolation wall extends alongside the sidewall in a parallel relationship to the sidewall when the isolation wall is in the undeformed state.

19. The battery cell of claim 1, wherein the isolation wall is in direct physical contact with the lower surface of the battery casing in the undeformed state.

* * * * *